United States Patent [19]
Higgins

[11] 3,894,802
[45] July 15, 1975

[54] STEREOSCOPIC GAGE AND GAGING SYSTEM

[75] Inventor: Paul T. Higgins, Orchard Lake, Mich.

[73] Assignee: The Bendix Corporation, Southfield, Mich.

[22] Filed: Dec. 26, 1973

[21] Appl. No.: 428,277

Related U.S. Application Data

[62] Division of Ser. No. 351,728, April 16, 1973, Pat. No. 3,837,198.

[52] U.S. Cl. .................. 356/2; 356/168; 350/132; 353/7
[51] Int. Cl.² ..................................... G01C 11/12
[58] Field of Search ....... 356/2, 163, 165, 168, 166; 350/132; 353/7, 10

[56] References Cited
UNITED STATES PATENTS

| | | | |
|---|---|---|---|
| 2,338,298 | 1/1944 | Overhage | 350/132 |
| 3,619,065 | 11/1971 | Agnew | 356/168 X |

Primary Examiner—Ronald L. Wibert
Assistant Examiner—Paul K. Godwin
Attorney, Agent, or Firm—James R. Ignatowski

[57] ABSTRACT

A stereoscopic optical system for gaging the surface of articles having complex contours or shapes is described. The system projects complementary sets of stereoscopic patterns on the article being gaged to determine the conformity of the article's surface to the desired contour or configuration. Nonconforming surfaces perturb the relationship between the complementary patterns imaged on the surface, of the article being gaged, giving a visual indication of a nonconformity. The perturbed relationship between the complementary patterns imaged on the surface of the article may also be detected electro-optically providing an electrical signal indicative of the nonconformity which can be used to initiate a number of automatic or semi-automatic machine operations including in-situ correction of the nonconforming surface.

4 Claims, 10 Drawing Figures

STEREOSCOPIC GAGE AND GAGING SYSTEM

This is a division of application Ser. No. 351,728, filed Apr. 16, 1973, now U.S. Pat. No. 3,837,198.

BACKGROUND OF THE INVENTION

The production gaging of complex three-dimensional surfaces remains as one of the most tedious and time consuming operations in the manufacture of contoured parts such as turbine blades, airfoils or other articles where the contour is critical to the function or fit of the article. Various types of mechanical and optical gages as evidenced by U.S. Pat. No. 2,621,556 "Comparator for Testing Turbine Blades and the Like" by Beardsley et al; U.S. Pat. No. 2,668,475 "Optical Apparatus for Inspecting the Contour of Articles" by J. Walker et al; U.S. Pat. No. 3,318,009 "Blade Examining Apparatus" by E. J. Tishler et al; and U.S. Pat. No. 3,588,256 "Optical Profile Projector" by P. Derossi are presently being used to gage three-dimensional surfaces, however, these methods are quite cumbersome and slow and the gaging and correction must be performed on different fixtures.

The inventive stereoscopic gage described in this application overcomes the objections of the gages of the prior art and in many instances permits the correction to be performed without removing the object from the gage.

The art of stereoscopy, wherein an observer mentally combines the images of two pictures taken from spatially separated vantage points to give the impression of depth, is well known. A stereoscopic microscope for measuring depths based on this principle is disclosed in U.S. Pat. No. 2,769,370 by R. E. Tompkins. Another adaptation of the stereoscopy to surface measurements is disclosed in U.S. Pat. No. 3,523,736 by S. C. Bottomley. In this patent an image from a single target is divided into two separate images each of which is obliquely incident on the surface of the object being gaged from spatially separated vantage points. The angle of incidence of the two images in the Bottomley patent are opposite but equal from a line normal to the plane of the surface being gaged so that the light reflected by the first image from the surface of the object is received by the optics imaging the second image and vice versa. The two images are then recombined by appropriate optics (mirrors and a beam splitter) so that the two reflected beams are coincident when the surface being gaged is in a predetermined position and has a predetermined angular disposition with respect to the incident images. A lateral displacement of the surface being gaged from the predetermined position or an angular disposition of the surface from the predetermined angle will cause the two recombined images to no longer be coincident but be laterally displaced, the lateral displacement of the two images being proportional to the lateral displacement or angular displacement of the surface being gaged from the predetermined position. The method disclosed in the Bottomley patent has the following disadvantages: (1) although it is capable of measuring a displacement of the surface, no means are provided for determining the direction of the displacement of the surface from the desired position; (2) the method of the Bottomley patent provides no means for distinguishing an angular displacement from a lateral displacement; and (3) the method of the Bottomley patent is limited to the measurement of flat surfaces only and is not applicable to determining the conformity of a curved surface. The inventive system and method overcome the deficiencies of the Bottomley patent and the other cited art by employing a further extention of the stereoscopic principles to optical gaging.

A pseudo three-dimensional image of an object can be constructed in space by stereoscopically projecting the images of two complementary stereo pictures or patterns. The complementary stereoscopic patterns may be made by photographing an object from spatially separated vantage points or by constructing the patterns by other means from the geometrical parameters of the object and the optical projection systems. This concept can probably be best illustrated by referring to FIG. 1. Two stereo pictures or patterns 10 and 20 having complementary parallel straight line images 12 and 22, respectively, are projected into space by a stereoscopic projection system consisting of two independent optical systems 14 and 24. The two optical systems 14 and 24 form two separate parallel images (dotted lines) 16 and 26 at the common focal plane 30 of the stereoscopic projection systems. The common focal plane 30 is defined in this context as the plane of exact focus of the two optical systems 14 and 24. In the following discussion, the location of the image is discussed with relation to an orthogonal coordinate system having one axis parallel to a common axis of the projection system, as shown on the figure. The Z axis is parallel to the optical axis of the projection system and represents depth, while the X and Y coordinates are the horizontal and vertical directions in a plane normal to the Z axis.

The images projected by the optical systems illustrated in FIG. 1 will remain in relatively good focus some finite distance in front of or behind the plane of exact focus due to the depth of field of the two optical systems. Therefore, the two projected parallel images 16 and 26 can be imaged on an infinisimal number of planes normal to the Z axis both before or behind the focal plane 30. Further, if the depth of field of the two optical systems 14 and 24 is sufficient, the two projected images 16 and 26, which are spatially separated at the focal plane 30, will superimpose, one upon the other, on a plane 31 (dashed line) other than, but parallel to, the focal plane 30, forming a single projected image 32 having common X, Y, and Z coordinates. The distance $d$ measured in the Z direction between the focal plane 30 and the plane 31 where the two images are superimposed is indicative of the true or desired location of the object's surface with respect to the focal plane of the projection system. Further, the superimposed images on plane 31 not only determines the Z displacement of the original object from the focal plane 30, but also the position of the planar axes X aand Y due to spatial separation of the two pictures 10 and 20.

It is readily recognized that if the complementary images are not parallel to each other but canted at an angle $\alpha$ and $\alpha'$ to each other as shown on FIG. 2, a plane wherein all the corresponding points of the two projected images are superimposed is also canted or at an angle $\beta$ to the focal plane 30 wherein the angle $\beta$ of the image plane 31 with respect to the focal plane 30 is proportional to the angles $\alpha$ and $\alpha'$ of the images 12 and 22 on the patterns 10 and 20 respectively. Likewise where the two complementary images are curved lines 18 and 28 as shown on FIG. 3, the plane where the corresponding points of the two projected images superimpose is a curved plane 33. In this manner, the points in space where the two complementary stereoscopic images superimpose may be used to define a surface of almost any desirable contour.

The inventive gage utilizes the above principle for gaging the surface contours of three-dimensional objects by projecting on the surface of the object being gaged, a number of complementary stereoscopic images which define the contour of the desired surface. The conformity or nonconformity of the surface of the gaged object to the desired surface contour can then be determined by whether or not the projected images superimpose on the surface of the object. The gaging may be further enhanced by projecting each one of the corresponding images in a different color so that the direction of the nonconformity may be easily determined. For example, if the images projected from the left picture are blue and the images projected from the right picture are red, then the superimposed images formed on the surface of the object would be the combination of red and blue and be a gray. However, if the surface of the object is high, i.e., forward of the plane where the two images would superimpose, two colored images would appear on the surface of the object, as shown on plane 30 of FIG. 1. The image on the left would be blue and the image on the right would be red. If the surface of the object was low, i.e., behind the plane where the two images superimpose, again two colored images would be formed. However, this time their order would be reversed and the red image would be on the left and the blue image would be on the right. Therefore, by projecting the images from each picture in a different color, not only can a nonconformity of the surface being gaged be detected, but also the direction of the nonconformity with respect to the desired contour.

This method of gaging is not only applicable to the gaging of single parts but also may be extended to determine the relationship of assembled parts to determine correct assembly or it even can be used to determine best fit for subsequent machining of a rough part by insuring that there is sufficient stock along the desired surface for the subsequent machining operation.

SUMMARY OF THE INVENTION

The invention is directed to a stereoscopic optical gage for gaging the surface of a contoured object or objects to determine the conformity of the object being gaged to the desired contour or shape. The gage consists of a holding mechanism for holding the object in a fixed spatial relationship to two spatially separated optical systems projecting stereoscopic images, on the object to be gaged. The two optical systems, each contain a stereoscopic mask (picture) having a plurality of corresponding images, which when projected by the spatially separated optical systems superimpose at various points in space and define the desired surface contour at predetermined locations. The projected images may be a point, a straight line or any other geometrical shape which defines the desired contour.

In its simplest embodiment, the projected images of the stereoscopic gage may be visually observed by an operator and the fault corrected, where possible by the operator using an appropriate tool. Because the inventive stereoscopic gaging method does not contact the surface being gaged, corrective operations such as twisting, bending or removing excess material may be accomplished in-situ, without removing the part from the gage's holding mechanism.

A more sophisticated embodiment of the invention gage is completely automated, having electro-optical sensors monitoring the projected images. Nonconformities are determined by means of well-known correlation techniques, and with the aid of a computer, the corrections may be automatically applied.

One object of the invention, therefore, is to provide a non-contacting stereoscopic gage for gaging the surface of an object with respect to a desired shape or contour.

Another object of the invention is to provide a stereoscopic gage in which the magnitude and direction of the nonconformity of the surface being gaged can be accurately determined.

A further object of the invention is to provide a stereoscopic gage wherein the nonconformity may be automatically detected and corrected without removal from the gage.

And still further another object of the invention is to provide a stereoscopic gage suitable for the production gaging of objects with complex contoured surfaces which is quicker and more accurate than the gages presently being used.

DETAILED DESCRIPTION

Figure 4:
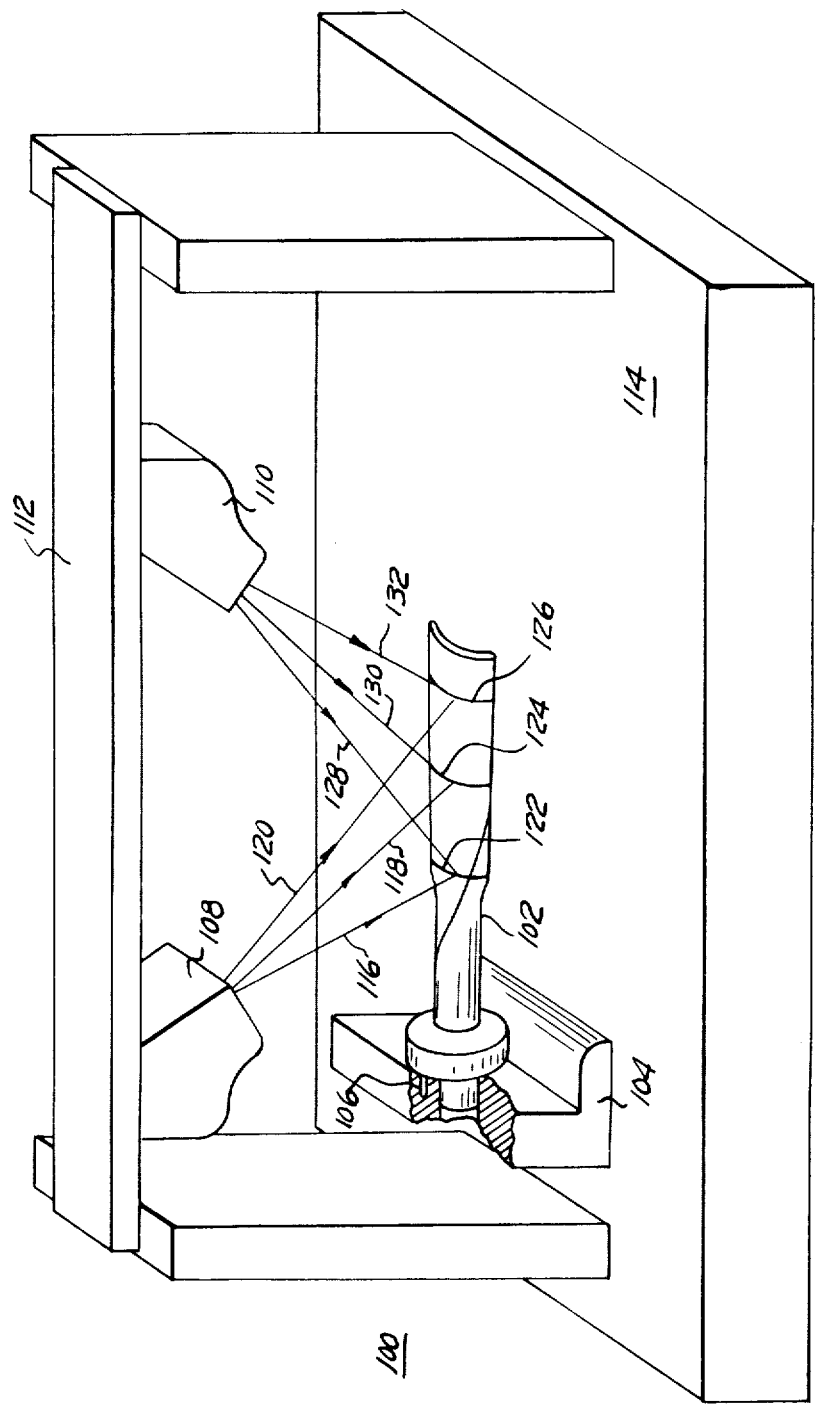
FIG. 4 is a perspective drawing showing the stereoscopic gage.

FIG. 4 shows a preferred embodiment of the inventive stereoscopic gage 100. An object or article to be gaged, illustrated as a turbine blade 102 is mounted in a holding fixture 104 configured to support the turbine blade in a fixed position with respect to the gage. A pin 106 or other type of keying device insures the proper orientation of the turbine blade in the holder. Two spatially separated stereoscopic optical systems 108 and 110 are rigidly supported above the turbine blade by a support 112. Both the support 112 and the holding fixture 104 are rigidly supported from a common base 114 providing a fixed relationship between the two optical systems 108 and 110 and the supported turbine blade 102. The optical system 108 projects, as illustrated by rays 116, 118, and 120, a blue stereoscopic pattern which when imaged on the surface of the turbine blade 102 forms a plurality of blue straight line images 122, 124, and 126 respectively. Optical system 110 also projects, as illustrated as rays 128, 130, and 132, a complementary red stereoscopic pattern which when imaged on the surface turbine blade 102 superimpose on the blue straight line images 122, 124, and 126 respectively causing the images 122, 124, and 126 to turn gray. The two projected images which form lines 122, 124 and 126 respectively are hereinafter referred to as a complementary set of images. Although the embodiment illustrated in FIG. 4 only shows three complementary sets of images defining the contour of the turbine blade at predetermined locations, the concept may be readily extended to project many more complementary sets of images which not only define the contours at different locations but could also be used to determine the location and size of holes, the position and height of bosses or the characteristics of other topographical features of importance.

Figure 1:
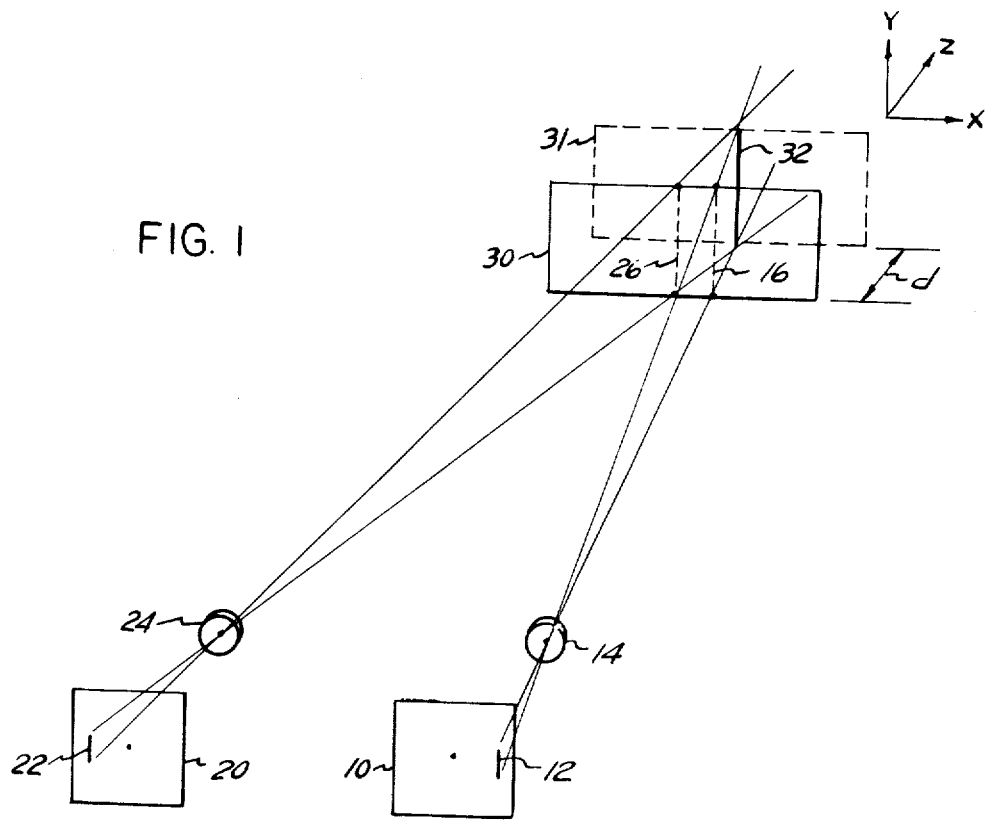
FIG. 1 is a perspective drawing illustrating the basic principles of stereoscopic projection forming an image normal to the projection axis.
Figure 2:
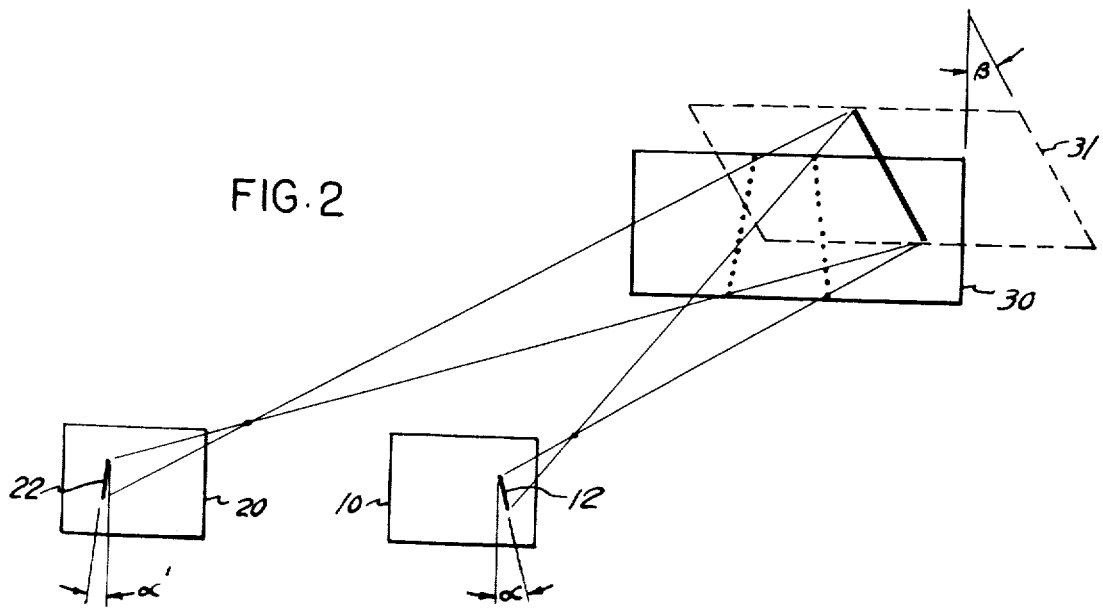
FIG. 2 is a perspective drawing illustrating the basic principles of stereoscopic projection forming an image on a plane not normal to the projection axis.
Figure 3:
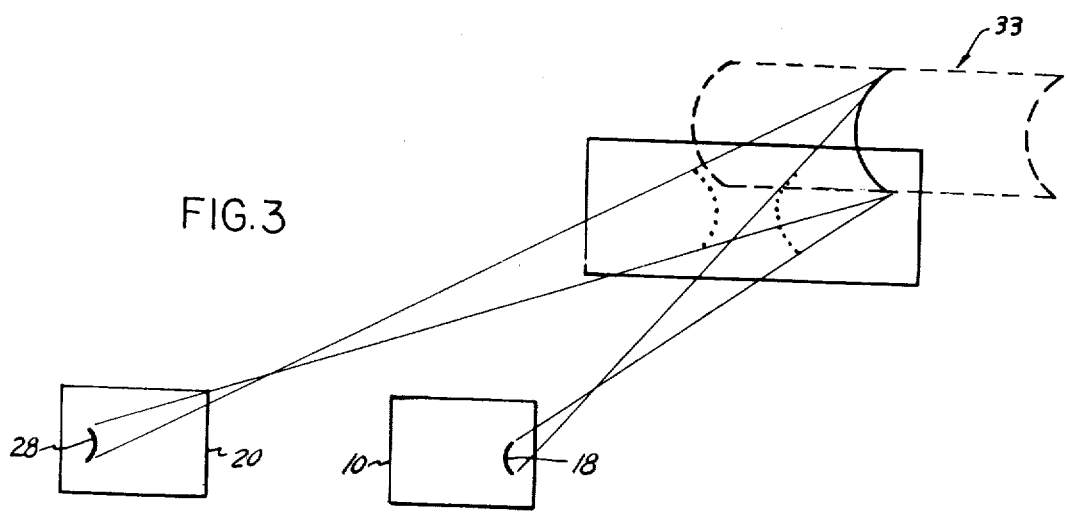
FIG. 3 is a perspective drawing illustrating the basic principles of stereoscopic projection forming an image on a curved plane.
Figures 5, 5A:
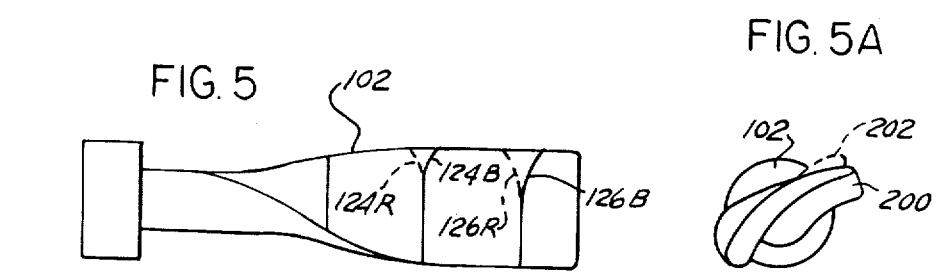
FIG. 5 is a top view of a turbine blade showing the relationship of the two projected images when the turbine blade is twisted.
FIG. 5A is an end view of the turbine blade of FIG. 5 showing the displacement of the surface from its desired position due to the twist.

The operation of the gage is discussed with reference to FIGS. 5–7. Consider a turbine blade 102 shown on FIG. 4 in which the blade section has an excessive twist in the clockwise direction when viewed from the tip end as shown in FIG. 5A. The actual contour of the blade is shown as a solid line 200 while the desired contour is shown as a dashed line 202. Because the surface of the section having the excessive twist lies below the desired surface, the complementary sets of images are no longer superimposed over their entire length and the red line images 124R and 126R separate from the blue line images 124B and 126B in the nonconforming area. The separation between the two lines in the nonconforming area is a measure of the displacement of that part of the turbine blade from its desired position. For example, if the red and blue images arrive at the surface of the turbine blade from opposite directions at an angle of 45° with respect to blade surface, then the separation (center to center) of the two lines is twice the displacement of the surface from its desired position. As the angles of incidence change for various other points on the blade, the relationship between the separation and the displacement also changes but can be precisely determined from simple geometric relationships. Once the nonconformity is detected, the operator may, with an appropriate tool twist or otherwise distort the blade back to its desired shape without removing from the holding fixture.

Had the twist in FIG. 5 been counterclockwise, a similar pattern would have been observed, however, the red and blue lines would have been reversed indicating that the nonconforming surface was higher than the desired surface.

Figure 6:
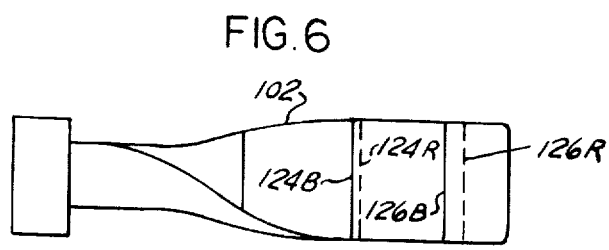
FIG. 6 is a top view of a turbine blade showing the relationship of the two projected images when the turbine blade has a bend.
Figure 7:
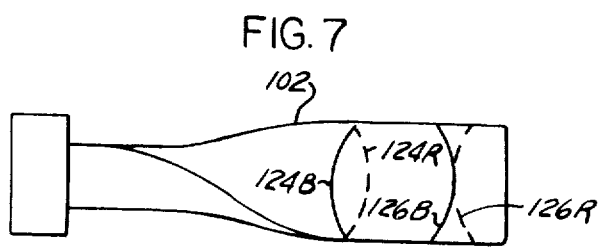
FIG. 7 is a top view of a turbine blade showing the relationship of the two projected images when the surface of the turbine blade is concave or convex.

FIG. 6 illustrates a typical pattern where the turbine blade has a vertical bend which places the tip of the blade closer to the stereoprojector than desired. Since the contour is correct, the projected images remain basically as straight lines but since the surface is higher than desired, the red lines 124R and 126R and blue lines 124B and 126B are separated by a distance which is a measure of the nonconformity as shown. The relationship of the projected images for a lateral or horizontal bend is dependent upon the contour of the surface being gaged. For convex or concave curved surfaces, the projected line images would not be parallel. Referring to FIG. 7, red lines 124R and blue lines 124B show the pattern for a convex surface and red lines 126R and blue lines 126B show the pattern for a concave surface. A horizontal displacement, however, may also be determined by the alignment of auxiliary images with definable structures along the turbine blade, such as a boss, hole or even the edge of the blade itself. It is to be appreciated that the surface nonconformities and the resultant complementary set of images illustrated in FIGS. 5–7 are exaggerated for illustration purposes. In reality the stereoscopic gage is quite sensitive to surface nonconformities, and displacements less than .005 inches can be determined by an operator using a 2× or 3× magnifier.

Figure 8:
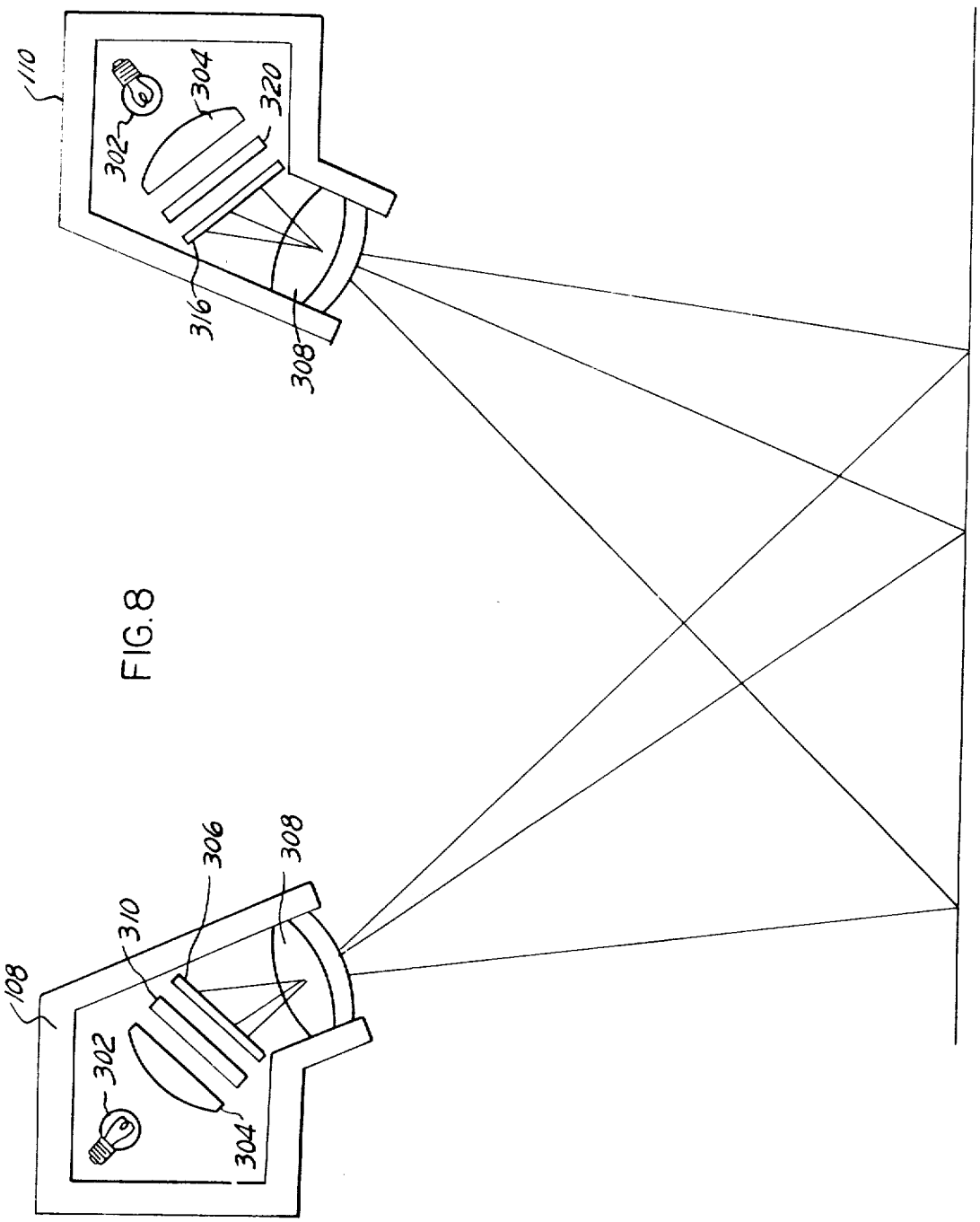
FIG. 8 is a cross-sectional view of the two projection systems showing the relationship of major component parts.

The details of the stereoscopic optical projection systems 108 and 110 are shown in FIG. 8. Although in the general discussion of stereoscopic imaging the optical axes of the projection systems were illustrated as being parallel to each other and generally normal to the plane of the surface being gaged, it is well known in the projection and photographic arts that off axis imaging such as that used in the stereoscopic gage can be significantly improved by canting the two projection systems slightly towards each other. The canting substantially increases the overlapping area of the two projected images, reduces the off axis performance requirements of the projection lens, increases the depth of field of the projected image and thereby permits the spatial separation between the two stereoscopic projection systems to be increased. All of the above factors tend to improve the performance of the stereoscopic gage. Referring to projection system 108, a light source shown as an incandescent lamp 302 with a condensor lens 304 illuminates a mask or picture 306 containing the stereoscopic pattern having a set of transparent images on an otherwise opaque background. The light transmitted by the transparent images is than projected onto the article being gaged by projection lens 308 forming magnified images of the pattern on the mask. A color filter 310 is inserted between the condensor lens and the mask to impart to the projected images a distinguishing color. Referring to projection system 110, a light source also shown as an incandescent lamp 302 with a condensor lens 304 illuminates a mask or picture 316 containing a complementary set of transparent images on an otherwise opaque background. A color filter 320 is inserted between the condensor lens and the mask to impart to the image projected by system 110 a color contrasting to the color of the images projected by system 108. Other features such as heat-absorbing filters, optical baffles, lamp cooling systems and focusing mechanisms normally incorporated into operative projection systems are not shown since they are immaterial to the discussion.

The complementary image masks in the projection systems may be made in any convenient manner. One method would be to photograph, through the projection optics, the surface of an article having the desired configuration with appropriate gaging patterns applied along the surface at predetermined locations. Enhancement of the photographically reproduced gaging pattern may be accomplished by painting the surface to be photographed black and applying white gaging patterns in the appropriate locations. A positive photographic transparency would produce the desired complementary masks one for each projection system having opaque backgrounds with transparent images. Of course, the article may be painted white with black gaging patterns and the article photographed with negative film, but this represents a procedural difference which is immaterial to the invention.

The gaging patterns may also be computer generated using the physical parameters of the projection systems and the desired surface of the article to be gaged. The computer generated masks would be particularly advantageous where minor changes in the pattern of an existing mask are desired or necessary to account for minor design changes.

Figure 9:
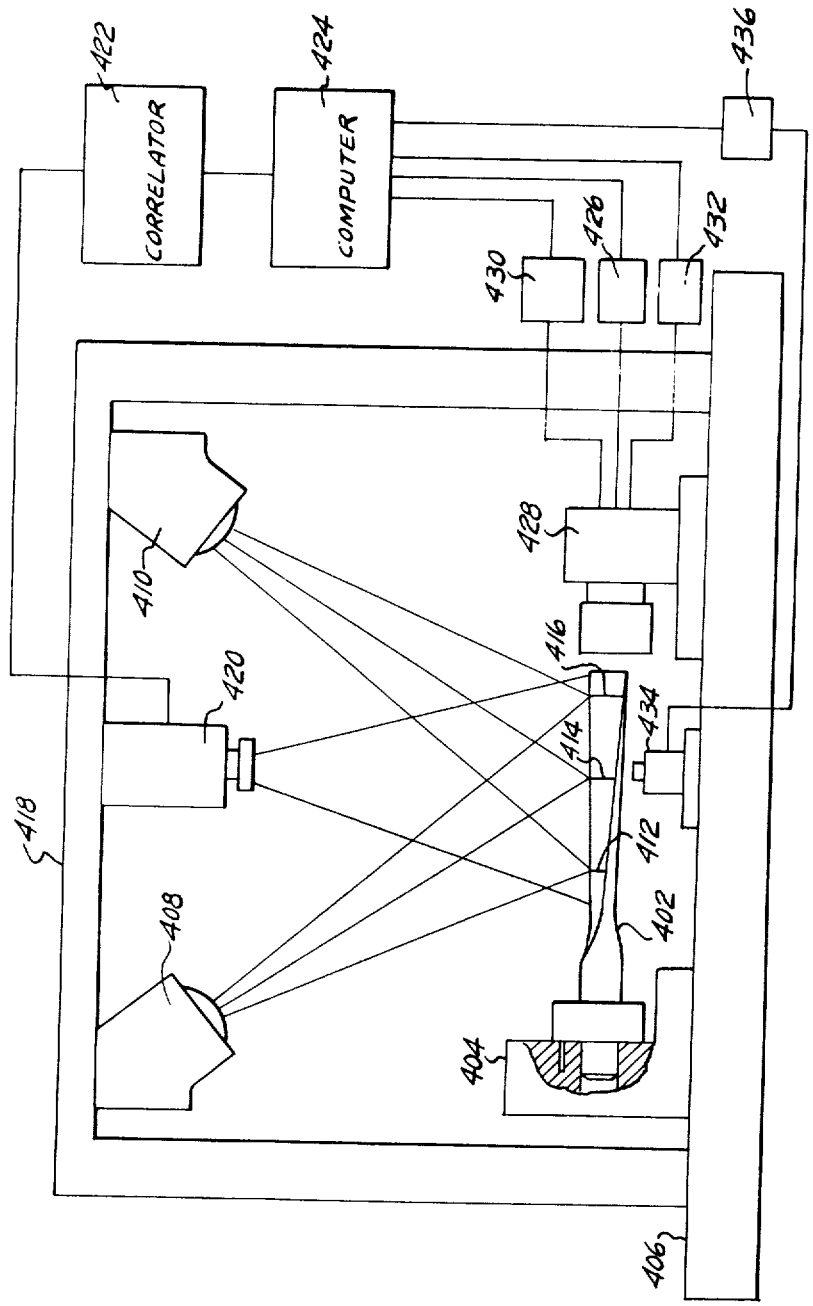
FIG. 9 is a side view of a fully automated gaging and straightening system showing the component parts and their inter-relationship.

A fully automated embodiment of the invention is illustrated in FIG. 9. An object to be gaged illustrated as a turbine blade 402 is rigidly supported in a predetermined position by a holding fixture 404 mounted on supporting structure 406. Two stereoscopic projectors 408 and 410 projecting complementary stereoscopic images 412, 414 and 416 on the surface of the turbine blade 402. The two stereoscopic projectors are rigidly attached to a support bridge 418 which holds the stereoscopic projectors in a fixed relationship to the turbine blade. A detector 420 is also attached to the support bridge 418 and monitors the position of the projected images on the turbine blade. The detector 420 may be a television type camera capable of distinguishing between the two projected images. Where the projected images are of different colors, a color filter wheel, adapted to synchronously rotate with the scan rate of the television camera, may be mounted between the image and the photosensitive surface of the camera. The color filters are selected so that the television camera tube is sensitive to only one set of the two projected color images at any given time. Therefore, during a given scan the television camera tube would generate a series of electrical pulses indicative of the position of each projected image of a given color. On the subsequent scan the second filter would be imposed between the camera tube and the object and the camera tube would generate a second series of electrical pulses indicative of the position of the second set of colored images. Although the illustrated embodiment shows a single sensor monitoring the complete set of projected images, some gaging applications may warrant the use of an individual sensor for each image or a preselected number of images.

The electrical signals generated by the sequential scan lines are stored in correlator 422. The correlator 422 electronically correlates the electrical signals indicative of the position of the corresponding colored images in each pattern and generates signals indicative of magnitude and direction of the displacement between the corresponding images. The correlation information is transmitted to computer 424 which stores the information until the complete pattern projected on the blade is scanned. After one or more complete scans have been stored, the computer analyzes the stored correlated data for each scanned image and determines the conformity or the nonconformity of the gaged surface to the desired surface. The output of the computer are error signals which are indicative of the magnitude and direction of the nonconformity, the type of nonconformity such as a twist, a bend or a bow. The signals, such as a signal indicative of twist in a given direction are applied to a buffer amplifier 426 which generates corrective signals operative to activate a reshaping device 428. For example, reshaping device 428 in response to the corrective signals generated by the buffer amplifier, may engage the end of the turbine blade and apply a rotational torque in a direction calculated to remove the nonconforming twist. The reshaping device 428 may also respond to corrective signals from amplifiers 430 and 432 and generate linear forces to remove nonconforming bends.

Although the reshaping device 428 is illustrated as a single device capable of removing both twists or bends, it is understood that individual devices may be used to perform each function independently. Other reshaping devices such as ram 434 responsive to control signals from the computer through buffer amplifier 436 may be spaced at various positions along the length and breadth of the turbine blade to perform various other corrective functions.

While the preferred embodiment shown in FIG. 9 shows the automated gage directing or controlling relatively simple mechanical corrective functions will be apparent to those skilled in the art that more sophisticated machining or corrective functions may be controlled by the automated stereoscopic gage. These may include grinding or machining material from preselected areas of the surface to achieve conformity or automatically aligning a part for subsequent machining or assembly.

Other changes in the preferred embodiments are also possible within the scope of the invention. For example, in the fully automated embodiment, the two projected stereoscopic images need not be of different colors but may have other identifying characteristics which could be electrooptically determined. The identifying characteristic could be a difference in brightness of the two images or the light sources may be modulated at different frequencies. These alternative methods would eliminate the need for the color filter wheel described in the preferred embodiment without departing from the spirit of the invention. Accordingly, it is intended that the illustrative and descriptive materials herein be used to illustrate principles of the invention and not to limit the scope thereof.

What is claimed is:

1. A system for gaging the surface of an object comprising:

means for supporting the object in a predetermined position;

means having a fixed relationship to said supported object for optically imaging from spatially separated vantage points two complementary stereoscopic patterns on the surface of said supported object each stereoscopic pattern having at least one coded image, and each coded image in one of said patterns has a complementary image in the other of said patterns, said complementary image in said other pattern having a code different from the code of the images in said one pattern, and each image in said one pattern and its complementary image in said other pattern form a set, wherein the relationship of the two images in each set is indicative of the conformity of the object's surface to the desired position at the location of the set, means for generating electrical signals indicative of the location of each coded image on the surface of the object, means for correlating the electrical signals indicative of the two coded images in each set to generate error signals indicative of the correspondence of the object's surface to the desired position at the location of each set; and means for generating a visual indication of the departure of the surface being gaged from said desired position at the location of each set in response to said error signals.

2. The system of claim 1 wherein said means for imaging includes:

first projector means for imaging said one pattern on the surface of said object; and second projector means, spatially separated from said first projector means along a line generally parallel to the surface of said object being gaged for imaging said other pattern on the surface of said object, wherein the two complementary images in each set superimpose at determinable points in space defining said desired position of the surface of the object at the location of each set.

3. The system of claim 2 wherein said first projector means includes means for imaging said one pattern in a first color and said second projector means includes means for imaging said other pattern in a second color different from said first color whereby each image projected by said first projector means can be distinguished from each complementary image projected by said second projector means.

4. The system of claim 3 wherein said means for generating a visual indication further includes means for generating a reject signal when said error signals exceed predetermined limits.

* * * * *